United States Patent
Li (10) Patent No.: US 8,996,072 B2
(45) Date of Patent: Mar. 31, 2015

(54) METHOD AND APPARATUS FOR CONTROLLING LIGHT EMITTING ELEMENTS IN TERMINAL DEVICE AND TERMINAL DEVICE

(71) Applicant: Huawei Device Co., Ltd., Shenzhen (CN)

(72) Inventor: Yuping Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/065,567

(22) Filed: Oct. 29, 2013

(65) Prior Publication Data

US 2014/0057683 A1 Feb. 27, 2014

Related U.S. Application Data

(63) Continuation of application No. PCT/CN2011/073507, filed on Apr. 29, 2011.

(51) Int. Cl.
*H04M 1/00* (2006.01)
*G09G 5/10* (2006.01)
*H04M 1/22* (2006.01)
*G06F 1/32* (2006.01)
*H04W 52/02* (2009.01)

(52) U.S. Cl.
CPC . *G09G 5/10* (2013.01); *H04M 1/22* (2013.01); *G06F 1/3265* (2013.01); *H04W 52/027* (2013.01); *H04M 2250/12* (2013.01); *H04M 2250/52* (2013.01); *Y02B 60/1242* (2013.01)
USPC .............................. 455/566; 455/418; 455/574

(58) Field of Classification Search
None
See application file for complete search history.

(56) References Cited

U.S. PATENT DOCUMENTS

| 8,238,968 B1* | 8/2012 | Frydman ................ 455/556.1 |
| 8,351,990 B2* | 1/2013 | Mikan et al. ................ 455/566 |
| 2007/0096935 A1* | 5/2007 | Lee et al. ............... 340/815.42 |

(Continued)

FOREIGN PATENT DOCUMENTS

| CN | 101272513 A | 9/2008 |
| CN | 101626424 A | 1/2010 |

(Continued)

OTHER PUBLICATIONS

Extended European Search Report issued in Jul. 22, 2014 in corresponding European Patent Application No. 11 777 152.7.

(Continued)

*Primary Examiner* — Erika A Washington
(74) *Attorney, Agent, or Firm* — Staas & Halsey LLP (57) ABSTRACT

A method for controlling light emitting elements includes: obtaining a first light intensity value detected by an ambient light sensor in a terminal device and obtaining a second light intensity value detected by an image capturing apparatus in the terminal device under same lighting conditions; determining a standard light intensity value corresponding to the second light intensity value according to a preset mapping between a light intensity value of the image capturing apparatus and a standard light intensity value of the ambient light sensor; obtaining a calibration parameter for the ambient light sensor according to the first light intensity value and the standard light intensity value; obtaining a detected light intensity value detected by the ambient light sensor when light emitting elements in the terminal device need to be controlled; and controlling the light emitting elements in the terminal device according to the detected light intensity value and the calibration parameter.

14 Claims, 3 Drawing Sheets

(56) References Cited

U.S. PATENT DOCUMENTS

| | | |
|---|---|---|
| 2007/0268241 A1 | 11/2007 | Nitta et al. |
| 2008/0090617 A1 | 4/2008 | Sutardja |
| 2008/0122821 A1* | 5/2008 | Nilsson et al. ............... 345/207 |
| 2008/0297466 A1 | 12/2008 | Kunimori et al. |
| 2009/0085485 A1 | 4/2009 | Young |
| 2010/0159980 A1 | 6/2010 | Mikan et al. ............... 455/556.1 |
| 2011/0012746 A1* | 1/2011 | Fish et al. ............... 340/691.6 |

FOREIGN PATENT DOCUMENTS

| | | |
|---|---|---|
| CN | 101789230 A | 7/2010 |
| CN | 101945179 A | 1/2011 |
| EP | 1 783 740 A1 | 5/2007 |
| JP | 2005-181602 | 7/2005 |
| JP | 2005-286523 | 10/2005 |
| JP | 2007-309984 | 11/2007 |
| JP | 2008-299160 | 12/2008 |
| JP | 2009-86664 | 4/2009 |
| JP | 2009-272735 | 11/2009 |

OTHER PUBLICATIONS

International Search Report issued Feb. 9, 2012, in corresponding International Patent Application No. PCT/CN2011/073507.

Japanese Office Action dated Oct. 28, 2014 in corresponding Japanese Patent Application No. 2014-506716.

* cited by examiner

METHOD AND APPARATUS FOR CONTROLLING LIGHT EMITTING ELEMENTS IN TERMINAL DEVICE AND TERMINAL DEVICE

CROSS-REFERENCE TO RELATED APPLICATIONS

This application is a continuation of International Application No. PCT/CN2011/073507, filed on Apr. 29, 2011, which is hereby incorporated by reference in its entirety.

TECHNICAL FIELD

The present invention relates to the field of technologies for controlling light emitting elements, and in particular, to a method and an apparatus for controlling light emitting elements in a terminal device, and a terminal device.

BACKGROUND

As people pay attention to green energy saving and product intelligence, ambient light sensors are applied more and more widely. An ambient light sensor can measure and capture illumination intensity of current ambient light, and can adjust luminance of various light emitting elements automatically according to the illumination intensity, optimize luminance control, and reduce power consumption of products. Common light emitting elements include a display screen, a keyboard backlight, and so on. For example, in mobile applications such as mobile phones, electricity consumed by a display is up to 30% of the total capacity of the battery. An ambient light sensor can detect the brightness and darkness of the environment, and the mobile phone may reduce luminance of the display in a relatively dark environment to reduce power consumption and prolong the service time of the battery as much as possible.

An ambient light sensor needs to convert received optical signals into electrical signals so as to implement the functions of a light sensor. Therefore, a terminal device needs to provide a photosensitive zone for the ambient light sensor. For example, by forming a hole on the terminal device or other means, light can be irradiated to the ambient light sensor. However, to show characteristics such as portability, some terminal devices nowadays become increasingly smaller and thinner. In this case, it is necessary to utilize every tiny space. Therefore, the ambient light sensor is relatively simple, and the photosensitive zone provided on the terminal device for it is very small, which, however, will bring adverse effects. For example, for a mobile phone, the effective exposure area of the ambient light sensor is generally a few tenths of a millimeter. In such conditions, if the mobile phone has dust that just covers the effective exposure area of the ambient light sensor due to improper sealing, or a fingerprint of the user just covers the effective exposure area of the ambient light sensor, the amount of incident ambient light may be affected, so that the amount of the ambient light actually irradiated onto the effective exposure area of the ambient light sensor may be greatly reduced, which leads to an increased recognition error, and may further affect the effectiveness of the terminal device in controlling light emitting elements (including the display screen, the keyboard backlight, and so on).

SUMMARY

The present invention provides a method and an apparatus for controlling light emitting elements in a terminal device and a terminal device to improve effectiveness of controlling the light emitting elements.

The present invention provides the following solutions:

A method for controlling light emitting elements in a terminal device includes:

obtaining a first light intensity value detected by an ambient light sensor in a terminal device and obtaining a second light intensity value detected by an image capturing apparatus in the terminal device under same lighting conditions;

determining a standard light intensity value corresponding to the second light intensity value according to a preset mapping between a light intensity value of the image capturing apparatus and a standard light intensity value of the ambient light sensor;

obtaining a calibration parameter for the ambient light sensor according to the first light intensity value and the standard light intensity value;

obtaining a detected light intensity value detected by the ambient light sensor when light emitting elements in the terminal device need to be controlled; and controlling the light emitting elements in the terminal device according to the detected light intensity value and the calibration parameter.

An apparatus for controlling light emitting elements in a terminal device includes:

an obtaining unit, configured to obtain a first light intensity value detected by an ambient light sensor in a terminal device and obtain a second light intensity value detected by an image capturing apparatus in the terminal device under same lighting conditions;

a standard value determining unit, configured to determine a standard light intensity value corresponding to the second light intensity value, which is obtained by the obtaining unit, according to a preset mapping between the second light intensity value and a standard light intensity value of the ambient light sensor;

a calibration parameter obtaining unit, configured to obtain a calibration parameter for the ambient light sensor according to the first light intensity value obtained by the obtaining unit and the standard light intensity value determined by the standard value determining unit;

a detected value obtaining unit, configured to obtain a detected light intensity value detected by the ambient light sensor when light emitting elements in the terminal device need to be controlled; and a controlling unit, configured to control the light emitting elements in the terminal device according to the detected light intensity value detected by the detected value obtaining unit and the calibration parameter obtained by the calibration parameter obtaining unit.

A terminal device includes an image capturing apparatus, an ambient light sensor, light emitting elements, and the aforesaid apparatus for controlling light emitting elements, where:

the image capturing apparatus is configured to collect image information through a camera, and send the image information to the apparatus for controlling light emitting elements;

the ambient light sensor is configured to detect ambient light, convert an optical signal of the ambient light into an electrical signal, and send the electrical signal to the apparatus for controlling light emitting elements; and the light emitting elements are configured to emit visible light or display visible content.

According to specific embodiments provided by the present invention, the present invention discloses the following technical effects:

In the embodiments of the present invention, an image capturing apparatus in a terminal device may be used to detect a light intensity value, and a calibration parameter for an ambient light sensor may be obtained with reference to a light intensity value detected by the ambient light sensor. In this way, on each occasion of controlling a light emitting element in the terminal device, after a detected light intensity value detected by the ambient light sensor is obtained, the detected light intensity value may be corrected with a calibration parameter, and then the corrected light intensity value may be used to control the light emitting element in the terminal device. Because the light intensity value detected by the ambient light sensor is calibrated with the light intensity information obtained by the image capturing apparatus, the accuracy of the light intensity value for controlling the light emitting element can be improved, thereby improving the effectiveness of controlling the light emitting element.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments, which can be derived by persons of ordinary skill in the art from the embodiments given herein without any creative effort, fall within the scope of the present invention.

Figure 1:
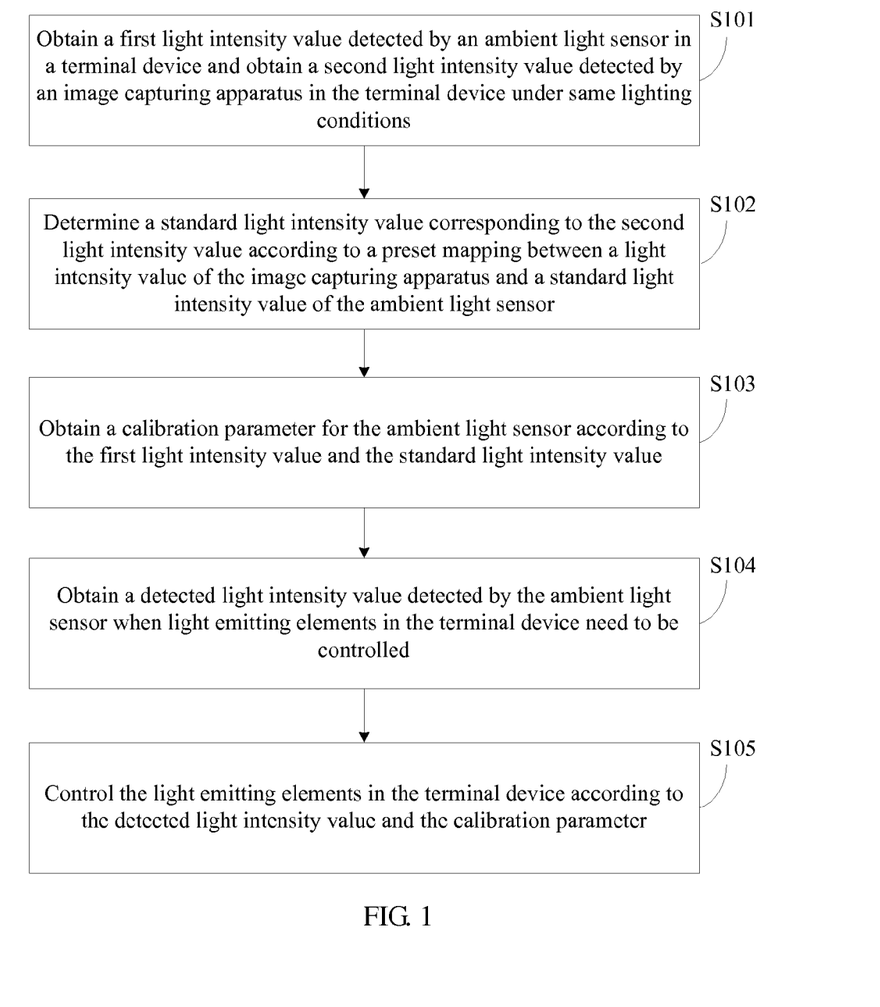
FIG. 1 is a flowchart of a method for controlling light emitting elements in a terminal device according to an embodiment of the present invention.

Referring to FIG. 1, a method for controlling light emitting elements in a terminal device according to an embodiment of the present invention includes the following steps:

S101. Obtain a first light intensity value detected by an ambient light sensor in a terminal device and obtain a second light intensity value detected by an image capturing apparatus in the terminal device under same lighting conditions.

In the terminal device, an image capturing apparatus is generally installed in addition to the ambient light sensor. Taking a mobile phone as an example of the terminal device, most mobile phones nowadays have a photographing function, which requires installation of an image capturing apparatus, such as a camera. The image capturing apparatus is also based on the principle of converting an optical signal into an electrical signal and also can detect light intensity information. Therefore, the image capturing apparatus may be regarded as another form of an ambient light sensing apparatus to some extent. Generally, the photosensitive zone of an image capturing apparatus does not easily fail due to interference or slight obstruction. Therefore, such a characteristic of the image capturing apparatus is used in the embodiment of the present invention. It is assumed that the interference received by the image capturing apparatus from external pollutants is ignorable, and that the ambient light sensor is calibrated by using the ambient light intensity value captured by the image capturing apparatus.

S102. Determine a standard light intensity value detected by the ambient light sensor corresponding to the second light intensity value under standard circumstances.

The standard circumstances refer to the same lighting conditions, that is, the intensity of light irradiated onto the ambient light sensor and the image capturing apparatus (for example, in an outdoor environment) is the same, and the photosensitive zone of the ambient light sensor is free from interference caused by external pollutants or other obstacles. That is, under the standard circumstances, the image capturing apparatus may detect a light intensity value, and correspondingly, the ambient light sensor may also detect a light intensity value. Moreover, under such standard circumstances, because the ambient light sensor is free from interference of external pollutants, the light intensity value detected by the ambient light sensor may be regarded as a standard light intensity value. The same lighting conditions refer to the same (for example, in an outdoor environment) or similar (for example, when facing the same light source that produces no obvious brightness or darkness difference) intensity of light irradiated onto the ambient light sensor and the image capturing apparatus.

It should be noted that the standard light intensity value may be obtained in advance, and when the ambient light sensor needs to be calibrated, the parameter is known and can be directly used. The method for obtaining the standard light intensity value will be detailed later.

S103. Obtain a calibration parameter for the ambient light sensor according to the first light intensity value and the standard light intensity value.

Steps S101-S103 above are equivalent to a calibration procedure in the terminal device. In practical applications, the calibration procedure may be started in different ways. For example, the terminal device may start the calibration procedure at regular intervals, or the user performs manual control, and so on. Every time when a light emitting element is controlled after a calibration procedure is completed, the calibration parameter obtained in the calibration procedure may be used to exercise control.

S104. Obtain a detected light intensity value detected by the ambient light sensor when light emitting elements in the terminal device need to be controlled.

S105. Control the light emitting elements in the terminal device according to the detected light intensity value and the calibration parameter.

The control on the light emitting elements includes adjustment of the display screen luminance and keyboard backlight, and so on. Before control is exercised on a light emitting element, a detected light intensity value still needs to be detected by the ambient light sensor. The detected light intensity value is detected by the ambient light sensor, and may be inaccurate because the photosensitive zone of the ambient light sensor may have been obstructed by dust or a fingerprint. It may be inaccurate if the detected light intensity value is directly used for controlling the light emitting element of the terminal device.

For example, the photosensitive zone of an ambient light sensor is obstructed by dust, and a detected light intensity value detected by the sensor is x, but in fact, the current ambient light intensity can be truly reflected only when the light intensity value is Z, where Z is greater than x. In this case, if the detected light intensity value x is directly used for adjusting the display screen luminance, the adjusted luminance may fail to match the actual ambient light intensity, thereby failing to produce a cozy picture.

In the embodiment of the present invention, the calibration parameter for the ambient light sensor has been obtained. Therefore, on an occasion of controlling a light emitting element, after a detected light intensity value detected by the ambient light sensor is obtained, the detected light intensity value may be corrected with the calibration parameter first so as to obtain a corrected light intensity value, and then the corrected light intensity value may be used to control the light emitting element, thereby improving effectiveness of controlling the light emitting element. For example, in the example given above, the calibration parameter may be Δx=Z−x. After the detected light intensity value x is obtained, the detected value is added to the calibration parameter to obtain an actual light intensity value, that is, x+Δx=x+(Z−x)=Z. With the calibration parameter, the light intensity value actually used to control the light emitting element can accurately reflect the actual ambient light intensity, thereby improving effectiveness of controlling the light emitting element.

That is to say, because the image capturing apparatus in the terminal device also needs to convert a received optical signal into an electrical signal, the terminal device also needs to provide a photosensitive zone for the image capturing apparatus; moreover, because the image capturing apparatus needs to collect a lot of information, the area of the photosensitive zone set for the image capturing apparatus on the terminal device is generally far greater than the photosensitive zone set for the ambient light sensor. Because the photosensitive zone of the image capturing apparatus is relatively large, the image capturing apparatus imposes less strict requirements on the environment than the ambient light sensor, and slight obstruction caused by dust or a fingerprint will not produce a great impact on the incident light intensity. Therefore, the light intensity information obtained by the image capturing apparatus is generally accurate, and is suitable for calibrating the light intensity value detected by the ambient light sensor to improve accuracy of the light intensity value used for controlling the light emitting element, thereby improving effectiveness of controlling the light emitting element.

In conclusion, the embodiment of the present invention can use an image capturing apparatus to calibrate a light intensity value detected by an ambient light sensor. Definitely, to achieve better calibration effects, the photosensitive zone of the image capturing apparatus may be greater than the photosensitive zone of the ambient light sensor.

Figure 2:
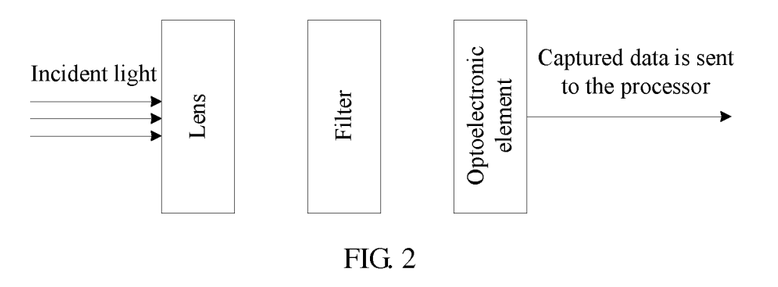
FIG. 2 is a schematic structural diagram of an image capturing apparatus.

To enable better understanding of the embodiment of the present invention, the following briefly describes the structure and the principles of the image capturing apparatus first. Referring to FIG. 2, the image capturing apparatus generally includes three parts: a lens LENS, a filter, and an optoelectronic element.

LENS: The imaging of the image capturing apparatus is primarily attributable to the optoelectronic element. To increase the lighting rate of the optoelectronic element, it is necessary to expand the photoreception area of a single pixel. While the lighting rate is increased, the picture quality deteriorates. LENS is equivalent to a lens added before the optoelectronic element, the lighting rate of the optoelectronic element does not depend on the opening area of the optoelectronic element, but depends on the surface area of the LENS.

Filter: Almost all colors recognizable by human eyes can be formed by three primary colors, red (R), green (G), and blue (B). Therefore, the filter primarily uses an RGB tricolor separation method, that is, color modulation is performed by using three channels, R, G, and B.

Optoelectronic element: The optoelectronic element converts a light source that penetrates the filter into an electrical signal, quantizes the electrical signal and transmits it to an image processing chip, and restores the image through a series of transformation, processing, modulation, and so on.

It can be seen that, although the image capturing apparatus can also detect the ambient light intensity, because the basic function of the image capturing apparatus is to capture images, the image information obtained by the apparatus is generally an RGB component of an image, which is another manner of representing an optical signal. Therefore, in order to obtain the second light intensity value required by the embodiment of the present invention from the image capturing apparatus, the image information obtained by the image capturing apparatus may be processed first.

Specifically, at an image collection stage, the image capturing apparatus generally uses a quantized RGB vector space to represent signal intensity of each color component. Generally, 8-bit binary data is used to express a component, and therefore there may be 256 levels. That is, the information obtained by the image capturing apparatus is an RGB component of each pixel, and the image processing chip can restore the color of each pixel according to the RGB component of each pixel.

In the image signal processing field, there is another method for representing light information, that is, a YUV vector space representation method, where, Y represents luminance (Luminance), U represents chrominance (Chrominance), and V represents chroma (Chroma). The Y component that represents luminance actually can represent light intensity information.

Because the RGB vector space and the YUV vector space are different ways of representing light information, the two vector spaces can be converted to each other. For example, an empiric formula for converting an RGB vector space into a YUV vector space is:

$$\begin{bmatrix} Y \\ U \\ V \end{bmatrix} = \begin{bmatrix} 0.299 & 0.587 & 0.114 \\ -0.14713 & -0.28886 & 0.436 \\ 0.615 & -0.51498 & -0.10001 \end{bmatrix} \begin{bmatrix} R \\ G \\ B \end{bmatrix} \quad (1)$$

Hence the Y component is:

$$Y = 0.299R + 0.578G + 0.114B \quad (2)$$

It can be seen that, if the image capturing apparatus collects an RGB component of a pixel, a Y value, that is, a luminance value, of the pixel may be calculated by using formula (2). That is to say, the processing of the image information obtained by the image capturing apparatus may be:

reading an RGB component value of one or more pixels in the image information collected by the image capturing apparatus, converting the read RGB component value into a Y value according to a relationship between the color component value and the light intensity value, and determining, according to the converted Y value, the light intensity value detected by the image capturing apparatus.

If an RGB component value of one pixel is read, the value may be directly converted into a light intensity value, and the converted light intensity value may be used directly as a light intensity value detected by the image capturing apparatus. If RGB component values of multiple pixels are read, the RGB component value of each pixel may be converted into a light intensity value first, and then an average value of all light intensity values may be calculated, and the average value may be used as a light intensity value detected by the image capturing apparatus. Alternatively, if RGB component values of multiple pixels are read, an average value of the RGB component values of the multiple pixels may be calculated first, and then a light intensity value corresponding to the average value of the RGB component values of the multiple pixels may be calculated, and the corresponding light intensity value may be used as a light intensity value detected by the image capturing apparatus. For example, the RGB values P1 (r1, g1, b1), P2 (r2, g2, b2), and P3 (r3, g3, b3) of three pixels P1, P2, and P3 are read, the average value $$\left(\frac{r1+r2+r3}{3}, \frac{g1+g2+g3}{3}, \frac{b1+b2+b3}{3}\right)$$

of the RGB component values of the three pixels is obtained, and then the average value $$\left(\frac{r1+r2+r3}{3}, \frac{g1+g2+g3}{3}, \frac{b1+b2+b3}{3}\right)$$

of the RGB component values may be converted into a light intensity value according to formula (2).

Because an image collected by the image capturing apparatus has numerous pixels, as regards which specific pixel will be selected for reading, no restriction may be set. For example, when the RGB component values of multiple pixels need to be read, multiple zones may be set in the image collected by the image capturing apparatus, and the RGB component values of multiple pixels are read from each zone respectively. Definitely, a central zone of the collected image generally has a better collection effect. Therefore, for measurement precision, the RGB component value of one or more pixels may be read from the central zone of the image collected by the image capturing apparatus. For example, the RGB component values of several pixels centered on an optoelectronic element may be collected, and the Y value corresponding to each of them is calculated, and then an average value of the Y values is used as a light intensity value detected by the image capturing apparatus. Based on the description above, in the calibration of the ambient light sensor, a mapping between the light intensity value detected by the ambient light sensor and the light intensity value detected by the image capturing apparatus may be obtained first under standard circumstances. The standard circumstances refer to the same lighting conditions, that is, the intensity of light irradiated onto the ambient light sensor and the image capturing apparatus (for example, in an outdoor environment) is the same, and the photosensitive zone of the ambient light sensor is free from obstruction. Therefore, in the process of research and development of a terminal device (ensuring that the photosensitive zone of the ambient light sensor is free from obstruction of dust, fingerprints, and so on), light intensity sampling may be performed by turning on the ambient light sensor and the image capturing apparatus simultaneously under the same lighting conditions. It is assumed that the light intensity sample value collected by the ambient light sensor is a, and that the light intensity sample value collected by the image capturing apparatus is A (which may be obtained by converting the RGB component value into a Y value, as described earlier). In this way, a and A may form a two-dimensional vector. The two-dimensional vector may represent a mapping between a quantized value of the light intensity collected by the ambient light sensor and a quantized value of the light intensity collected by the image capturing apparatus under standard circumstances. Afterward, a table of two-dimensional vectors may be generated for continuously changing ambient light intensity according to a linear change relationship of the two quantized values, as shown in Table 1:

TABLE 1

| Light Intensity Value Detected by Ambient Light Sensor (a) | $a_1$ | $a_2$ | $a_3$ | ... | $a_n$ | $a_{n+1}$ | ... |
|---|---|---|---|---|---|---|---|
| Light Intensity Value Detected by Image Capturing Apparatus (A) | $A_1$ | $A_2$ | $A_3$ | ... | $A_n$ | $A_{n+1}$ | ... |

Because the Y value is generally expressed by 8-bit binary data, there may be 256 levels. That is, the light intensity value A detected by the image capturing apparatus may have 256 levels. In Table 1, there may be 256 two-dimensional vectors, representing 256 types of light intensity. Definitely, when the Y value is expressed by other means, such as 16-bit binary data, the maximum light intensity level that can be expressed in Table 1 may be different.

After the data in Table 1 is obtained, the data in Table 1 may be fixed into the terminal device as standard data to which reference may be made during calibration.

It should be noted that as regards the data in Table 1 above, the standard data may be obtained for each different terminal device in the way described above, and therefore, each terminal device may use its own standard data for calibrating the ambient light sensor, which leads to high accuracy. Definitely, in the case that the required calibration accuracy is not very high, the standard data is not necessarily obtained for each terminal device respectively. For example, for the same batch of terminal devices, after the standard data of one of the terminal devices is obtained, the standard data may be used as standard data of the batch of terminal devices, and so on.

The terminal device, for which the standard data is obtained, can use the standard data to calibrate the ambient light sensor. As mentioned above, the calibration procedure may be started automatically at regular intervals, or started by the user manually, or started automatically whenever the terminal device is started, and so on. When the calibration procedure is started, the image capturing apparatus may be turned on automatically. Meanwhile, the user may be reminded to put the terminal device into a better illuminated place to ensure that the intensity of light irradiated onto the ambient light sensor and the image capturing apparatus is the same, for example, in an outdoor environment.

Afterward, in the calibration procedure, the color (RGB) component values of several pixels collected by the image capturing apparatus may be read, and the Y value corresponding to each pixel may be calculated by using formula (2), and then an average value of the Y values may be used as a component value collected by the image capturing apparatus for representing the light intensity. Meanwhile, the data x collected by the ambient light sensor is read, and the two make up a two-dimensional vector (x, Y). It can be seen that, the method for obtaining the two-dimensional vector (x, Y) is the same as the method for obtaining the two-dimensional vector (a, A) in Table 1; if the ambient light sensor is free from obstruction, (x, Y) should be a vector among the two-dimensional vectors in Table 1. Otherwise, if (x, Y) is not a vector among the two-dimensional vectors in Table 1, it indicates that the ambient light sensor may be obstructed and needs to be calibrated. Therefore, after the two-dimensional vector (x, Y) is obtained, it may be compared with each two-dimensional vector in Table 1 to judge whether the two-dimensional vector (x, Y) exists in Table 1; if the two-dimensional vector exists, the ambient light sensor does not need to be calibrated; otherwise, if the two-dimensional vector does not exist, it indicates that the ambient light sensor needs to be calibrated.

Specifically, when the ambient light sensor is calibrated, because Table 1 has enumerated various possible Y values, the two-dimensional vector corresponding to the currently obtained Y value can surely be found in Table 1. Therefore, "the two-dimensional vector (x, Y) does not exist in Table 1" means that the light intensity value detected by the ambient light sensor corresponding to the Y value in Table 1 should be $a_m$, where $a_m$ is unequal to x; moreover, the inequality is caused by reduced incident light in the case that the ambient light sensor receives interference from external pollutants. Therefore, $a_m$ should be greater than x. As described above, when the ambient light sensor needs to be calibrated, the $a_m$ value corresponding to the Y value may be read from Table 1 first, and then $k=a_m-x$ is used as a calibration parameter.

In this way, every time when the light intensity value detected by the ambient light sensor needs to be retrieved after the calibration parameter is obtained, the retrieved data may be added to the calibration parameter to act as an adjusted light intensity value, and the adjusted light intensity value is delivered to an upper-layer management program (such as a light emitting element management program), thereby ensuring that the upper-layer management program uses a more accurate ambient light intensity value to perform corresponding control operations, and improving effectiveness of the control operations.

Figure 3:
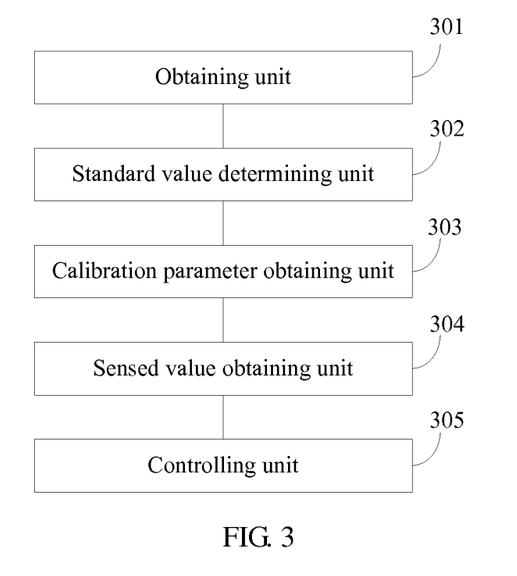
FIG. 3 is a schematic diagram of an apparatus for controlling light emitting elements in a terminal device according to an embodiment of the present invention.

Corresponding to the method for controlling light emitting elements in a terminal device in the embodiment of the present invention, an apparatus for controlling light emitting elements in a terminal device is further provided by an embodiment of the present invention. Referring to FIG. 3, the apparatus includes:

an obtaining unit 301, configured to obtain a first light intensity value detected by an ambient light sensor in a terminal device and obtain a second light intensity value detected by an image capturing apparatus in the terminal device under same lighting conditions;

where, to improve the calibration accuracy, the photosensitive zone of the image capturing apparatus may be greater than the photosensitive zone of the ambient light sensor;

a standard value determining unit 302, configured to determine a standard light intensity value corresponding to the second light intensity value according to a preset mapping between the second light intensity value and a standard light intensity value of the ambient light sensor;

a calibration parameter obtaining unit 303, configured to obtain a calibration parameter for the ambient light sensor according to the first light intensity value obtained by the obtaining unit 301 and the standard light intensity value determined by the standard value determining unit 302;

a detected value obtaining unit 304, configured to obtain a detected light intensity value detected by the ambient light sensor when light emitting elements in the terminal device need to be controlled; and a controlling unit 305, configured to control the light emitting elements in the terminal device according to the detected light intensity value detected by the detected value obtaining unit 304 and the calibration parameter obtained by the calibration parameter obtaining unit 303.

The obtaining unit 301 may include:
a reading subunit, configured to read a color component value of an image from image information collected by the image capturing apparatus; and a converting subunit, configured to convert the read color component value into a light intensity value according to a relationship between the color component value and the light intensity value, and determine, according to the converted light intensity value, the second light intensity value detected by the image capturing apparatus.

The reading subunit may be specifically configured to:
read a color component value of a pixel from a central zone of an image collected by the image capturing apparatus;

or, to make calibration more precise, the reading subunit may be specifically configured to read color component values of multiple pixels from a central zone of an image collected by the image capturing apparatus, and use an average value of the color component values of the multiple pixels as a color component value of the image;

or, the reading subunit may be specifically configured to respectively read color component values of multiple pixels from multiple preset zones of an image collected by the image capturing apparatus, and use an average value of the color component values of the multiple pixels as a color component value of the image.

In practical applications, the controlling unit 305 may include:
a light intensity correcting subunit, configured to add the detected light intensity value to the calibration parameter to obtain a corrected light intensity value, where the calibration parameter is a difference between the standard light intensity value and the first light intensity value; and a controlling subunit, configured to adjust luminance and/or display content of a light emitting element in the terminal device according to the corrected light intensity value.

In specific implementation, the apparatus may further include:
a starting unit, configured to compare the obtained first light intensity value and second light intensity value against a preset mapping, and when a value corresponding to the second light intensity value in the mapping is unequal to the first light intensity value, start the standard value determining unit 302 to perform an operation of determining the standard light intensity value corresponding to the second light intensity value.

With the apparatus for controlling light emitting elements in a terminal device in the embodiment of the present invention, an image capturing apparatus in the terminal device may be used to detect a light intensity value, a light intensity value detected by an ambient light sensor is calibrated, and a calibration parameter for the ambient light sensor is obtained. In this way, on each occasion of controlling a light emitting element in the terminal device, after a detected light intensity value detected by the ambient light sensor is obtained, the detected light intensity value may be corrected with a calibration parameter, and then the corrected light intensity value is used to control the light emitting element in the terminal device. Because the image capturing apparatus in the terminal device also needs to convert a received optical signal into an electrical signal, the terminal device also needs to provide a photosensitive zone for the image capturing apparatus; moreover, because the image capturing apparatus needs to collect a lot of information, the area of the photosensitive zone set for the image capturing apparatus on the terminal device is generally far greater than the photosensitive zone set for the ambient light sensor. Because the photosensitive zone of the image capturing apparatus is relatively large, the image capturing apparatus imposes less strict requirements on the environment than the ambient light sensor, and slight obstruction caused by dust or a fingerprint will not produce a great impact on the incident light intensity. Therefore, the light intensity information obtained by the image capturing apparatus is generally accurate, and is suitable for calibrating the light intensity value detected by the ambient light sensor to improve accuracy of the light intensity value used for controlling the light emitting element, thereby improving effectiveness of controlling the light emitting element.

Figure 4:
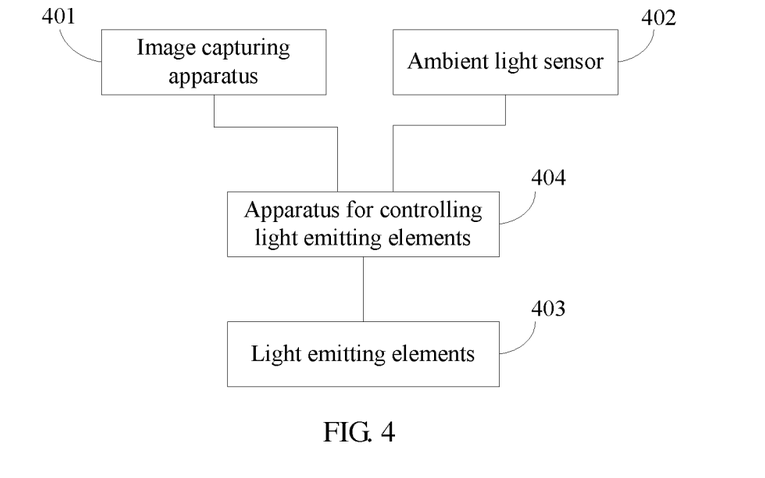
FIG. 4 is a schematic diagram of a terminal device according to an embodiment of the present invention.

Corresponding to the method and apparatus for controlling light emitting elements in a terminal device in the embodiment of the present invention, a terminal device is further provided by an embodiment of the present invention. Referring to FIG. 4, the terminal device may include: an image capturing apparatus 401, an ambient light sensor 402, light emitting elements 403, and an apparatus for controlling light emitting elements as described in the preceding embodiment.

The image capturing apparatus 401 is configured to collect image information through a camera, and send the image information to the apparatus 404 for controlling light emitting elements.

The ambient light sensor 402 is configured to detect ambient light, convert an optical signal of the ambient light into an electrical signal, and send the electrical signal to the apparatus 404 for controlling light emitting elements.

The light emitting elements 403 are configured to emit visible light or display visible content.

The terminal device may be a mobile phone, a man-machine interaction terminal, an electronic book reader, or another terminal device with a display function. When the terminal device is a mobile phone, the light emitting elements 403 may include one or a combination of several of the following: a display screen, a keyboard backlight, and an indicator. In addition, the mobile phone may further include a radio frequency circuit, a microphone, a speaker, and a power supply to perform basic functions of the mobile phone. The following describes the radio frequency circuit, the microphone, the speaker, and the power supply respectively. The radio frequency circuit is primarily configured to set up communication between the mobile phone and a wireless network, and implement receiving and sending of data between the mobile phone and the wireless network; the microphone is configured to collect sound and convert the collected sound into sound data, so that the mobile phone sends the sound data to the wireless network through the radio frequency circuit; the speaker is configured to restore sound from sound data received by the mobile phone from the wireless network through the radio frequency circuit, and play the sound to a user; and the power supply is primarily configured to power each circuit or element of the mobile phone to ensure normal working of the mobile phone.

Definitely, in practical applications, to achieve better calibration effects, the photosensitive zone of the image capturing apparatus 401 may be greater than the photosensitive zone of the ambient light sensor 402.

The embodiment of the apparatus for controlling light emitting elements and the embodiment of the terminal device correspond to the embodiment of the method for controlling light emitting elements described earlier. Therefore, for the part that is not detailed, reference may be made to the description in the method embodiment, and no repeated description is given herein.

Persons of ordinary skill in the art should understand that all or part of the steps of the method in the embodiments may be implemented by a computer program instructing relevant hardware. The program may be stored in a computer readable storage medium. When the program is run, the following steps are included: obtaining a first light intensity value detected by an ambient light sensor in a terminal device and obtaining a second light intensity value detected by an image capturing apparatus in the terminal device under same lighting conditions; determining a standard light intensity value corresponding to the second light intensity value according to a preset mapping between a light intensity value of the image capturing apparatus and a standard light intensity value of the ambient light sensor; obtaining a calibration parameter for the ambient light sensor according to the first light intensity value and the standard light intensity value; obtaining a detected light intensity value detected by the ambient light sensor when light emitting elements in the terminal device need to be controlled; and controlling the light emitting elements in the terminal device according to the detected light intensity value and the calibration parameter. The storage medium may be a ROM/RAM, a magnetic disk, an optical disk, and so on.

A method and an apparatus for controlling light emitting elements in a terminal device and a terminal device that are provided in the present invention are introduced in detail in the foregoing. In this specification, specific examples are used for illustrating principles and implementation manners of the present invention. The foregoing descriptions of the embodiments are merely used to help understand the method and core idea of the present invention. Meanwhile, persons of ordinary skill in the art may make modifications to the specific implementation manners and application scopes according to the idea of the present invention. In conclusion, the content of the specification shall not be construed as a limitation to the present invention.

What is claimed is:

1. A method for controlling light emitting elements in a terminal device, comprising:
    obtaining a first light intensity value detected by an ambient light sensor in a terminal device and obtaining a second light intensity value detected by an image capturing apparatus in the terminal device under same lighting conditions;
    determining a standard light intensity value corresponding to the second light intensity value according to a preset mapping between a light intensity value of the image capturing apparatus and a standard light intensity value of the ambient light sensor;
    obtaining a calibration parameter for the ambient light sensor according to the first light intensity value and the standard light intensity value;
    obtaining a detected light intensity value detected by the ambient light sensor when light emitting elements in the terminal device need to be controlled; and
    controlling the light emitting elements in the terminal device according to the detected light intensity value and the calibration parameter.

2. The method according to claim 1, wherein the obtaining a second light intensity value detected by an image capturing apparatus in the terminal device comprises:
    reading a color component value of an image from an image information collected by the image capturing apparatus; and
    converting the read color component value of the image into a light intensity value according to a relationship between the color component value and the light intensity value, and determining, according to the converted light intensity value, the second light intensity value detected by the image capturing apparatus.

3. The method according to claim 2, wherein the reading a color component value of an image from an image information collected by the image capturing apparatus comprises:
    reading a color component value of a pixel from a central zone of the image collected by the image capturing apparatus and using the color component value as the color component value of the image; or reading color component values of multiple pixels from a central zone of the image collected by the image capturing apparatus and using an average value of the color component values of the multiple pixels as the color component value of the image; or reading color component values of multiple pixels respectively from multiple preset zones of the image collected by the image capturing apparatus and using an average value of the color component values of the multiple pixels as the color component value of the image.

4. The method according to claim 1, wherein the preset mapping between the light intensity value of the image capturing apparatus and the standard light intensity value of the ambient light sensor comprises:

a mapping between the light intensity value detected by the image capturing apparatus and the light intensity value detected by the ambient light sensor based on same lighting conditions in a case where the image capturing apparatus and the ambient light sensor are not damaged and are free from external interference; or a mapping between the light intensity value detected by the image capturing apparatus and the light intensity value detected by the ambient light sensor based on same lighting conditions before the terminal device is delivered from a factory.

5. The method according to claim 1, wherein the controlling the light emitting elements in the terminal device according to the detected light intensity value and the calibration parameter comprises:

adding the detected light intensity value to the calibration parameter to obtain a corrected light intensity value, wherein the calibration parameter is a difference between the standard light intensity value and the first light intensity value; and adjusting luminance and/or display content of the light emitting elements in the terminal device according to the corrected light intensity value.

6. The method according to claim 1, wherein:

a photosensitive zone of the image capturing apparatus is greater than a photosensitive zone of the ambient light sensor.

7. The method according to claim 1, wherein the determining a standard light intensity value corresponding to the second light intensity value further comprises:

comparing the obtained first light intensity value and second light intensity value against the preset mapping, and starting an operation of determining the standard light intensity value corresponding to the second light intensity value when a value corresponding to the second light intensity value in the mapping is unequal to the first light intensity value.

8. An apparatus for controlling light emitting elements in a terminal device, comprising:

an obtaining unit, configured to obtain a first light intensity value detected by an ambient light sensor in a terminal device and obtain a second light intensity value detected by an image capturing apparatus in the terminal device under same lighting conditions;

a standard value determining unit, configured to determine a standard light intensity value corresponding to the second light intensity value, which is obtained by the obtaining unit, according to a preset mapping between the second light intensity value and a standard light intensity value of the ambient light sensor;

a calibration parameter obtaining unit, configured to obtain a calibration parameter for the ambient light sensor according to the first light intensity value obtained by the obtaining unit and the standard light intensity value determined by the standard value determining unit;

a detected value obtaining unit, configured to obtain a detected light intensity value detected by the ambient light sensor when light emitting elements in the terminal device need to be controlled; and a controlling unit, configured to control the light emitting elements in the terminal device according to the detected light intensity value detected by the detected value obtaining unit and the calibration parameter obtained by the calibration parameter obtaining unit.

9. The apparatus according to claim 8, wherein the obtaining unit comprises:

a reading subunit, configured to read a color component value of an image from an image information collected by the image capturing apparatus; and a converting subunit, configured to convert the color component value of the image read by the reading subunit into a light intensity value according to a relationship between the color component value and the light intensity value, and determine, according to the converted light intensity value, the second light intensity value detected by the image capturing apparatus.

10. The apparatus according to claim 9, wherein the reading subunit is specifically configured to:

read a color component value of a pixel from a central zone of the image collected by the image capturing apparatus and use the color component value as the color component value of the image; or read color component values of multiple pixels from a central zone of the image collected by the image capturing apparatus and use an average value of the color component values of the multiple pixels as the color component value of the image; or read color component values of multiple pixels respectively from multiple preset zones of the image collected by the image capturing apparatus and use an average value of the color component values of the multiple pixels as the color component value of the image.

11. The apparatus according to claim 8, wherein the controlling unit comprises:

a light intensity correcting subunit, configured to add the detected light intensity value to the calibration parameter to obtain a corrected light intensity value, wherein the calibration parameter is a difference between the standard light intensity value and the first light intensity value; and a controlling subunit, configured to adjust luminance and/or display content of a light emitting element in the terminal device according to the corrected light intensity value.

12. The apparatus according to claim 8, further comprising:

a starting unit, configured to compare the obtained first light intensity value and second light intensity value against the preset mapping, and start the standard value determining unit to perform an operation of determining the standard light intensity value corresponding to the second light intensity value when a value corresponding to the second light intensity value in the mapping is unequal to the first light intensity value.

13. A terminal device, comprising an image capturing apparatus, an ambient light sensor, light emitting elements, and the apparatus for controlling light emitting elements according to claim 8;

the image capturing apparatus is configured to collect image information, and send the image information to the apparatus for controlling light emitting elements;

the ambient light sensor is configured to detect ambient light, convert an optical signal of the ambient light into an electrical signal, and send the electrical signal to the apparatus for controlling light emitting elements; and the light emitting elements are configured to emit visible light or display visible content.

14. The terminal device according to claim 13, wherein:

the terminal device is a mobile phone; the light emitting elements comprise one or a combination of several of the following: a display screen, a keyboard backlight, and an indicator; a photosensitive zone of the image capturing apparatus is greater than a photosensitive zone of the ambient light sensor; and the mobile phone further comprises a radio frequency circuit, an audio circuit, and a power supply circuit, wherein the radio frequency circuit is configured to set up communication between the mobile phone and a wireless network, and implement receiving and sending of data between the mobile phone and the wireless network; the audio circuit is configured to collect sound and convert the collected sound into sound data, so that the mobile phone sends the sound data to the wireless network through the radio frequency circuit, and/or restore sound from sound data received by the mobile phone from the wireless network through the radio frequency circuit, and play the sound to a user; and the power supply circuit is configured to power each circuit or element of the mobile phone.

* * * * *